US012572496B2

(12) United States Patent
Muntz

(10) Patent No.: US 12,572,496 B2
(45) Date of Patent: Mar. 10, 2026

(54) HOST FABRIC ADAPTER WITH FABRIC SWITCH

(71) Applicant: CORNELIS NETWORKS, INC., Wayne, PA (US)

(72) Inventor: Gary Muntz, Lexington, MA (US)

(73) Assignee: Cornelis Networks, Inc., Wayne, PA (US)

( * ) Notice: Subject to any disclaimer, the term of this patent is extended or adjusted under 35 U.S.C. 154(b) by 97 days.

(21) Appl. No.: 18/504,921

(22) Filed: Nov. 8, 2023

(65) Prior Publication Data

US 2025/0147915 A1 May 8, 2025

(51) Int. Cl.
*G06F 13/42* (2006.01)
*G06F 13/40* (2006.01)

(52) U.S. Cl.
CPC ...... *G06F 13/4282* (2013.01); *G06F 13/4022* (2013.01); *G06F 2213/0026* (2013.01)

(58) Field of Classification Search
None
See application file for complete search history.

(56) References Cited

U.S. PATENT DOCUMENTS

| | | | | |
|---|---|---|---|---|
| 2007/0165596 A1* | 7/2007 | Boyd | ...................... | H04L 45/54 370/389 |
| 2011/0283028 A1* | 11/2011 | Byers | .................. | G06F 13/4022 710/107 |
| 2019/0104206 A1* | 4/2019 | Goel | ........................ | H04L 45/64 |
| 2022/0141558 A1* | 5/2022 | Ballani | .............. | H04Q 11/0071 370/351 |
| 2023/0010285 A1* | 1/2023 | Rivaud | ................ | G02B 6/4452 |

* cited by examiner

*Primary Examiner* — Farley Abad
*Assistant Examiner* — Dayton Lewis-Taylor
(74) *Attorney, Agent, or Firm* — H. Artoush Ohanian

(57) ABSTRACT

A host fabric adapter is disclosed. Embodiments include a high-speed serial expansion bus and at least two fabric ports configured to receive links from corresponding ports of at least two switches, each of which comprise corresponding switches in parallel and independent topologies. The host fabric adapter includes at least two packet processing pipelines configured for reception and transmission of packets through the fabric ports; a PCIe switch configured to receive a packet on the expansion bus and select a pipeline for transmission and configured to receive a packet from one of the pipelines and transmit the packet on the expansion bus. The host fabric adapter also includes a fabric switch configured to receive a packet from one of the fabric ports and select a pipeline for transmission to the PCIe switch and to receive a packet on one of the pipelines; and select one of the fabric ports for transmission of the packet on the fabric.

18 Claims, 6 Drawing Sheets

HOST FABRIC ADAPTER WITH FABRIC SWITCH

BACKGROUND

High-Performance Computing ('HPC') refers to the practice of aggregating computing in a way that delivers much higher computing power than traditional computers and servers. HPC, sometimes called supercomputing, is a way of processing huge volumes of data at very high speeds using multiple computers and storage devices linked by a cohesive fabric. HPC makes it possible to explore and find answers to some of the world's biggest problems in science, engineering, business, and others.

A conventional "dual-rail network" refers to a redundant network infrastructure that uses two separate and independent network paths or "rails" for data transmission. The primary purpose of dual-rail networks is to enhance network reliability and fault tolerance in HPC and data center environments. Dual-rail networks provide redundancy by maintaining two physically separate network paths. Dual-rail networks can be used for fault tolerance, load balancing and can enhance overall network performance.

Current dual rail networks in HPC environments require application-level software to select between each of the redundant independent networks and administer communications through the networks. Such conventional software solutions do not scale well. It would be advantageous to have a fast and scalable switching mechanism between independent networks.

BRIEF DESCRIPTION OF THE DRAWINGS

Many aspects of the present disclosure can be better understood with reference to the following drawings. The components in the drawings are not necessarily to scale, with emphasis instead being placed upon illustrating the principles of the disclosure. Moreover, in the drawings, like reference numerals designate corresponding parts throughout the several views.

DETAILED DESCRIPTION

Figure 1:
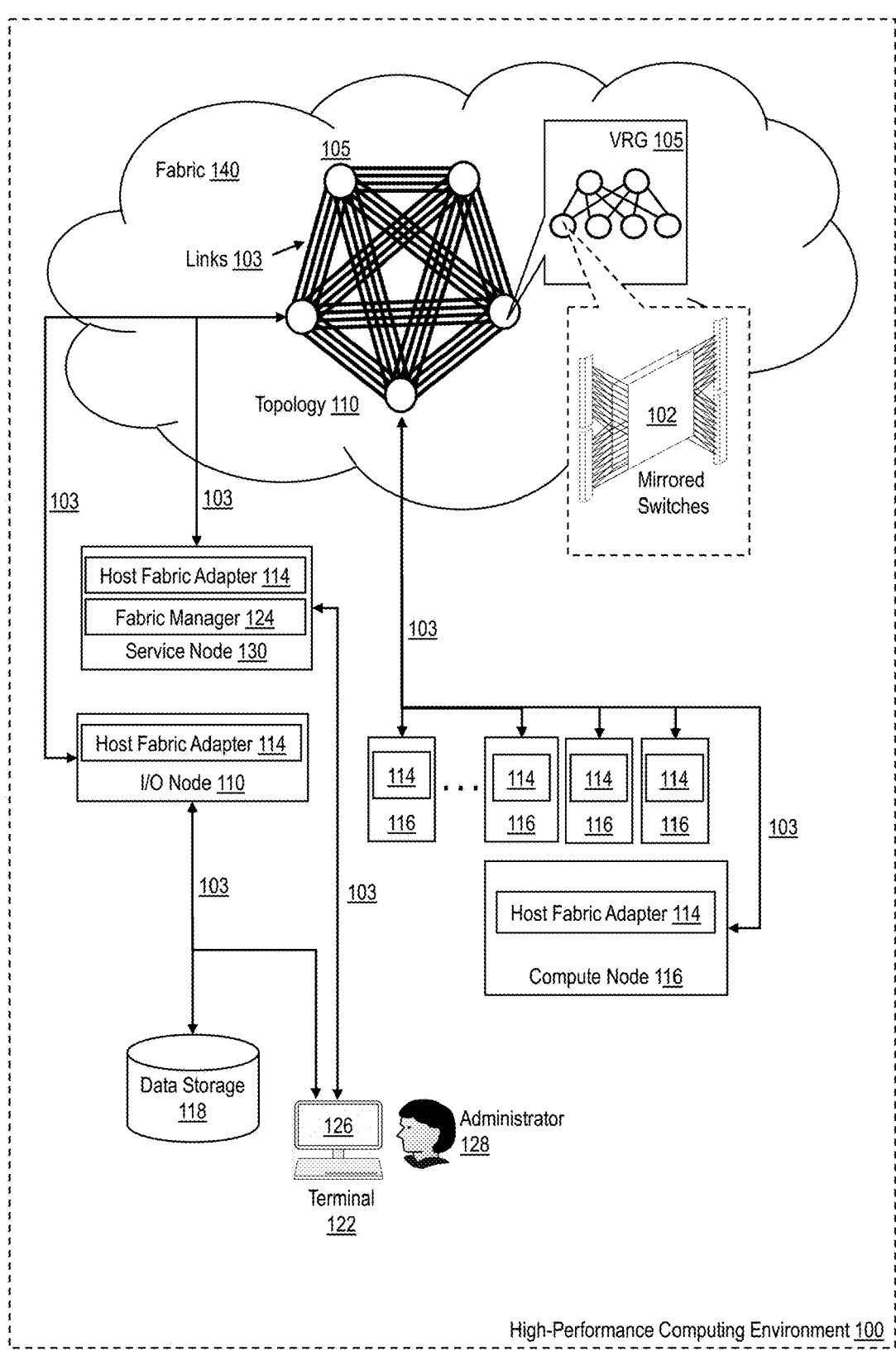
FIG. 1 sets forth a system diagram of an example high-performance computing environment according to embodiments of the present invention.

Methods, systems, devices, and products for high performance computing with mirrored switch configurations and host fabric adapters according to embodiments of the present invention are described with reference to the attached drawings beginning with FIG. 1. FIG. 1 sets forth a system diagram of an example high-performance computing environment (100) with a fabric (140) including mirrored switch configurations according to embodiments of the present invention. As will be shown in more detail below, mirroring the switches and their links and combining them in an adapter enables doubling the bandwidth of the fabric without conventional drawbacks by providing parallel and independent topologies of mirrored switches. The exposed radix of the individual switches so mirrored is unchanged so the scale and performance of the fabric is manageable and predictable.

Mirroring current generation switches, hereafter called the lower-bandwidth baseline, forms a double-bandwidth step-up in performance without the drawbacks of other methods of increasing bandwidth. The cost of mirroring the switches is simply twice that of the lower-bandwidth baseline per link. The mirrored switch configuration adopts a form of SerDes lane count increase without change to the SerDes rate. This is enabled by a switching function in software or hardware that balances transmission over the parallel networks creating a fabric of mirrored switches and mirrored topologies according to embodiments of the present invention. Mirrored switch configurations useful with embodiments of the present invention are described in U.S. patent application Ser. No. 18/069,020 entitled "Mirrored Switch Configuration," incorporated herein by reference in its entirety.

This inventive approach of mirroring switches has the advantage of reusing current generation switches having the lower-bandwidth baseline but doubling overall bandwidth for the fabric. Optimized packaging minimizes cable cost and complexity. Furthermore, this bandwidth increase through use of more SerDes lanes in parallel, without changing their data rate, also retains the full reach and raw bit error rate of the lower-bandwidth baseline. In contrast, shifting to higher-bandwidth SerDes necessarily compromises reach and/or raw bit error rate The example of FIG. 1 provides at each endpoint, host fabric adapters with fabric ports to accommodate links from each of a plurality of independent and parallel topologies. The host fabric adapters include a plurality of pipelines and a fabric switch adapted to receive packets from the mirrored switch configuration and route them to the processor through the appropriate packet processing pipeline.

Turning now to FIG. 1, FIG. 1 depicts a high-performance computing environment according to example embodiments of the present invention. The example high-performance computing environment of FIG. 1 includes an aggregation of a service node (130), an Input/Output ("I/O") node (110), a plurality of compute nodes (116) each including a host fabric adapter ('HFA') (114) according to embodiments of the present invention. The example of FIG. 1 is a unified computing system that includes a fabric (140) of interconnected HFAs, links, and switches that often look like a weave or a fabric when seen collectively.

The HFAs (114), switches (102) and links (103) are arranged in topology. A topology is a wiring pattern among switches, HFAs, and other components and routing algorithms used by the switches to deliver packets to those components. Switches, HFAs, and their links may be connected in many ways to form many topologies, each designed to optimize performance for their purpose. Examples of topologies useful according to embodiments of the present invention include HyperX topologies, Star topologies, Dragonflies, Megaflies, Trees, Fat Trees, and many others.

The example of FIG. 1 depicts a Megafly topology (110) which is an all-to-all connected set of virtual router groups (105). Virtual router groups ('VRGs') (105) are themselves a collection of nodes and switches with their own topology—in this case a two-tiered tree. In the example of FIG. 1, the switches themselves are mirrored (160) according to embodiments of the present invention as will occur to those of skill in the art. 'Mirror,' 'mirroring,' or 'mirrored' in this disclosure is used to describe the parallel use of more than one switch with the same or very similar specifications. The mirrored switches are placed in corresponding locations within independent topologies which themselves are arranged as mirrored or dual topologies providing data transmission for the compute nodes of the fabric. In this way, the fabric comprises mirrored parallel and independent topologies available to the compute nodes of the fabric for data transmission.

The term mirror is not meant to limit the number of mirrored switches or mirrored topologies to two. In fact, embodiments of the present invention may include three or more mirrored switches in three or more mirrored topologies each connected to an adapter for a compute node such that the compute node may use all three or more topologies for data transmission to other nodes of the fabric. Mirroring the switches and their links and combining them in an adapter enables increasing the bandwidth of the fabric without many of the traditional drawbacks The example of FIG. 1 includes a service node (130). The service node (130) of FIG. 1 provides service common to pluralities of compute nodes, loading programs into the compute nodes, starting program execution on the compute nodes, retrieving results of program operations on the compute nodes, and so on. The service node of FIG. 1 runs a service application and communicates with administrators (128) through a service application interface that runs on a computer terminal (122).

The service node (130) of FIG. 1 has installed upon it a fabric manager (124). The fabric manager (124) of FIG. 1 is a module of automated computing machinery for configuring, monitoring, managing, maintaining, troubleshooting, and otherwise administering elements of the fabric (140). The example fabric manager (124) is coupled for data communications with a fabric manager administration module with a graphical user interface ('GUI') (126) allowing administrators (128) to configure and administer the fabric manager (124) through a terminal (122) and in so doing configure and administer the fabric (140). In some embodiments of the present invention, routing algorithms are controlled by the fabric manager (124) which in some cases configures routes from endpoint to endpoint.

The compute nodes (116) of FIG. 1 operate as individual computers including at least one central processing unit ('CPU'), volatile working memory and non-volatile storage. The compute nodes are connected to the switches (102) and links (103) through a host interface adapter (114). The hardware architectures and specifications for the various compute nodes vary and all such architectures and specifications are well within the scope of the present invention as will occur to those of skill in the art. Such non-volatile storage may store one or more applications or programs for the compute node to execute.

Each compute node (116) in the example of FIG. 1 has installed upon it or is connected for data communications with a host fabric adapter (114) ('HFA'). Host fabric adapters according to example embodiments of the present invention deliver high bandwidth and increase cluster scalability and message rate while reducing latency. The HFA adapts packets from the node for transmission through the fabric maximizing scalability and performance.

The example HFAs (114) of FIG. 1 connect hosts such as a compute nodes (116) to the fabric (140) of mirrored switches (102) and links (103). The HFAs (114) of FIG. 1 includes fabric ports adapted to receive, from corresponding ports of mirrored switches, one link from one port of one of the mirrored switches and one link from a corresponding port of another of the mirrored switches. "Corresponding ports" means ports on each switch with the same function in the topology. Such ports may or may not be in a corresponding physical location on the individual switches but the ports function topologically in the same manner with regard to their respective mirrored topology. Once so connected, compute nodes of the fabric are directly linked with two or more parallel and independent topologies for data transmission.

The example HFAs (114) of FIG. 1 also include packet processing pipelines and a fabric switch. The fabric switch routes packets from each of the mirrored switches to the appropriate packet processing pipeline. Compared with single pipelines handling multiple packets per clock, multiple pipelines enable smaller packets at line rate and higher message rate with cost-effective ASIC design.

The switches (102) of FIG. 1 are multiport modules of automated computing machinery, hardware and firmware, that receive and transmit packets. Typical switches receive packets, inspect packet header information, and transmit the packets according to routing tables configured in the switch. Often switches are implemented as or with one or more application specific integrated circuits ('ASICs'). In many cases, the hardware of the switch implements packet routing and firmware of the switch configures routing tables, performs management functions, fault recovery, and other complex control tasks as will occur to those of skill in the art.

The switches (102) of the fabric (140) of FIG. 1 are connected to other switches with links (103) to form one or more topologies. Links (103) may be implemented as copper cables, fiber optic cables, and others as will occur to those of skill in the art. In some embodiments, the use of double density cables may also provide increased bandwidth in the fabric. Such double density cables may be implemented with optical cables, passive copper cables, active copper cables and others as will occur to those of skill in the art. An example cable useful with mirrored switch configurations according to embodiments of the present invention include QSFP-DD cables. QSFP-DD stands for Quad Small Form Factor Pluggable Double Density. The QSFP-DD complies with the IEEE802.3bs and QSFP-DD MSA standards.

The example of FIG. 1 includes an I/O node (110) responsible for input and output to and from the high-performance computing environment. The I/O node (110) of FIG. 1 is coupled for data communications to data storage (118) and a terminal (122) providing information, resources, GUI interaction and so on to an administrator (128).

Figure 2:
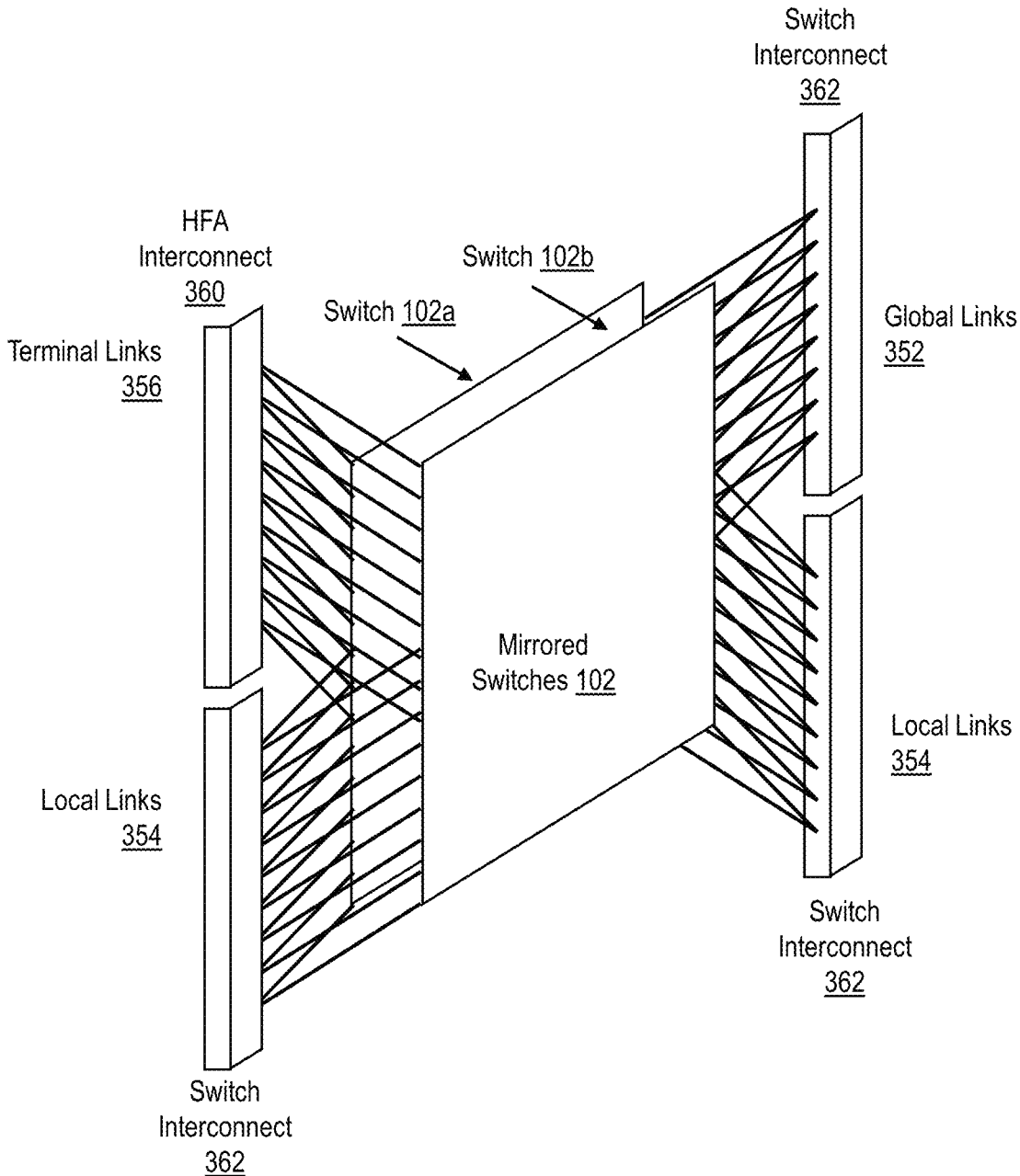
FIG. 2 sets forth a line drawing of mirrored switches according to example embodiments of the present invention.

For further explanation, FIG. 2 sets forth a line drawing of mirrored switches according to example embodiments of the present invention. Such mirrored switches may be arranged to form mirrored parallel and independent topologies. In the example of FIG. 2, each switch (102s and 102b) has the same baseline bandwidth and the same radix and port configurations. The particular ratio of allocated ports in the example of FIG. 2 dictates that each switch provides ports for eight terminal links (356) to compute nodes through HFA interconnects (360) and sixteen ports in switch interconnects (362) for sixteen local links to other switches in the VRG and eight ports for global links (352) to other VRGs. The switches (102a and 102b) have corresponding ports (714a and 714*b*) accommodating the terminal links (356), the local links (354), and the global links (352).

The example of FIG. 2 reflects a mirrored switch in a Dragonfly topology with radix 32 (32 ports on each mirrored switch). This is for explanation and not for limitation. Switches according to embodiments of the present invention often have more than 32 ports such as 48 radix switches available from Cornelis Networks and other as will occur to those of skill in the art.

Figure 3:
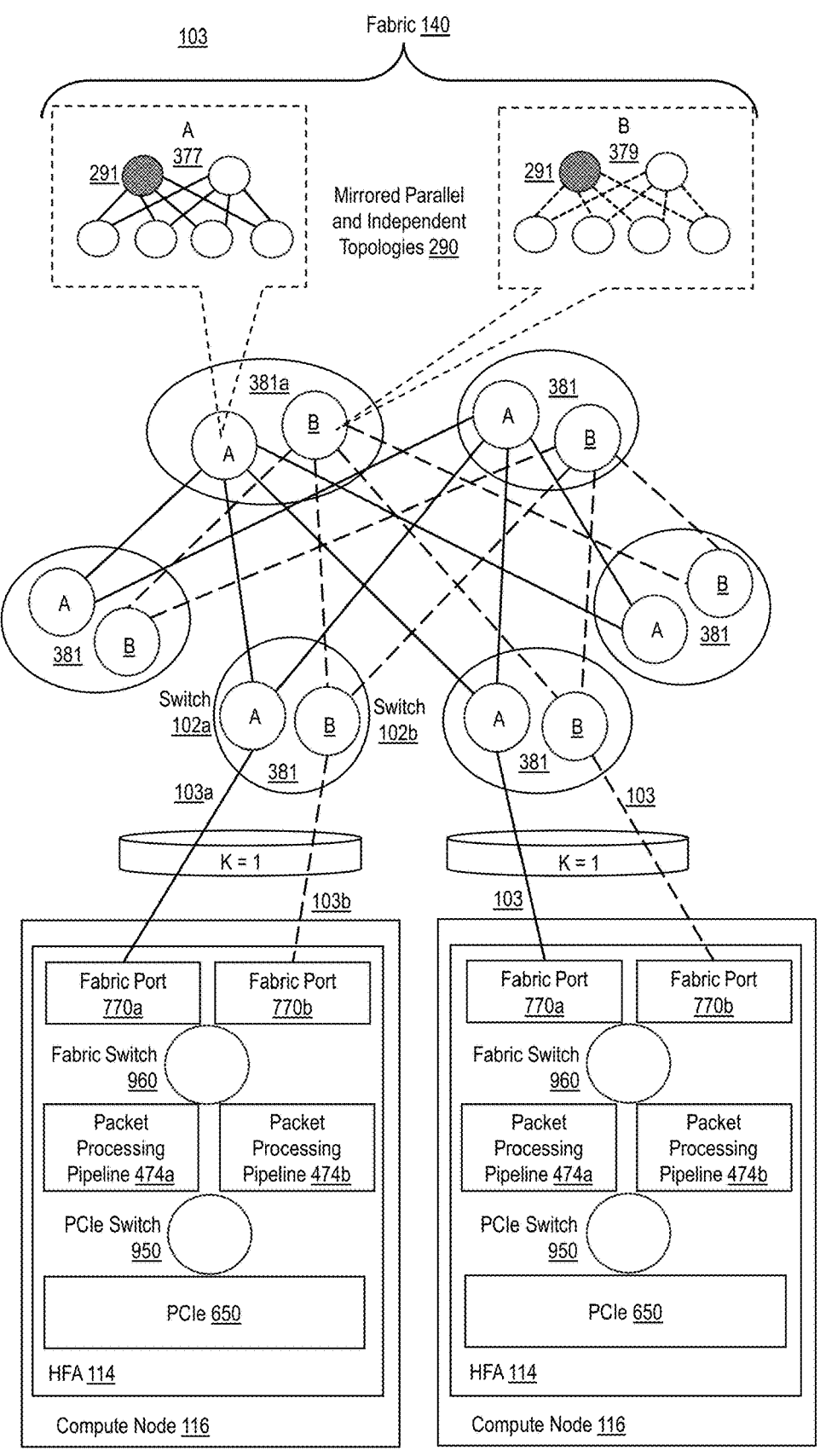
FIG. 3 sets forth a line drawing of a simplified example of a fabric having mirrored topologies of mirrored switch configurations and host fabric adapters according to example embodiments of the present invention.

For further explanation, FIG. 3 sets forth a line drawing of a simplified example of a fabric having mirrored topologies of mirrored switch configurations according to example embodiments of the present invention. The example of FIG. 3 illustrates two compute nodes (116) each connected to two sets of switches both of which are arranged in a two-tier tree topology (290). The two topologies (290) are mirrored in that the sets of switches comprising them have the same baseline bandwidths and corresponding radix and port configurations. The parallel topologies are independent and mirror one another. To illustrate this mirrored configuration, a single switch in each topology is highlighted to demonstrate that the switch resides in same location in its respective topology as the corresponding switch in the mirrored topology. Together, these topologies and their compute nodes create a simplified fabric.

In the example of FIG. 3, each compute node (116) includes a host fabric adapter (114) with a high-speed serial expansion bus (650), in this example PCIe. PCIe is PCI Express (Peripheral Component Interconnect Express), abbreviated as PCIe or PCI-e, is a high-speed serial computer expansion bus standard. The description of PCIe is for explanation and not for limitation. In alternative embodiments, for example, a Compute Express Link ('CXL') may be used instead of PCIe. CXL is an open standard for high-speed central processing unit (CPU)-to-device and CPU-to-memory connections, designed for high performance data center computers. CXL is built on the PCI Express (PCIe) physical and electrical interface and includes PCIe-based block input/output protocol (CXL.io) and new cache-coherent protocols for accessing system memory (CXL.cache) and device memory (CXL.mem).

The HFAs (114) of FIG. 3 include at least two fabric ports (770*a* and 770*b*) configured to receive links (103) from corresponding ports of at least two switches (102*a*, 102*b*), each of the at least two switches (102*a*, 102*b*) comprising corresponding switches in parallel and independent topologies (290). For clarity, the switches in topology A (377) are labeled with an "A" and the switches in topology B (379) are labeled with a "B."

The HFAs (114) of FIG. 3 also include at least two packet processing pipelines (474*a*, 474*b*) configured for reception and transmission of packets through the fabric ports (770*a*, 770*b*). As mentioned above, multiple pipelines enable smaller packets at line rate and higher message rate with cost-effective ASIC design than does a single pipeline handling multiple packets per clock. The packet processing pipelines may be configured for packet length at line rate and message rate.

The HFAs (114) of FIG. 3 include a PCIe switch (950) configured to receive a data on the expansion bus (650) and select a pipeline (474*a*, 474*b*) for transmission and configured to receive data from one of the pipelines (474*a*, 474*b*) for transmission on the expansion bus (650).

The HFAs (114) of FIG. 3 include a fabric switch (960) configured to receive a packet from one of the fabric ports (702*a*, 702*b*) and select a pipeline (474*a*, 474*b*) for transmission to the PCIe switch (950) and to receive a packet on one of the pipelines (474*a* 474*b*) and select one of the fabric ports (702*a*, 702*b*) for transmission of the packet on the fabric.

In some embodiments, host fabric adapters of the present invention have the same number of packet processing pipelines and fabric ports and each of the packet processing pipelines are assigned to one or more fabric endpoints. In alternate embodiments, HFAs according to the present invention may include many fabric ports and many processing pipelines in various configurations as will occur to those of skill in the art.

A physical link (103) connects each of the physical devices. For example, fabric port (770*a*) and switch A (102*a*) are connected by a physical link (103*a*). Fabric port (770*b*) is connected to switch B (102*b*) with a physical link (103*b*). From a topological perspective, the mirrored switches and their links to the HFA (114) operate in many ways as a single switch with twice the bandwidth and twice the radix. In the example of FIG. 1, the two links (103*a* and 103*b*) between the mirrored switches (102*a* and 102*b*) and the HFA may be considered topologically as a single logical link. As such, for configuration and other purposes, the two links are designated as a single logical link or K=1.

Extending the convention, a logical switch (381) may be composed of a separate physical switch (A) (102*a*) and (B) (102*b*) per mirrored topology (290). Each logical switch (381) corresponds to a single switch position in the mirrored topology. In the example of FIG. 3, logical switch (381*a*) corresponds with switch position (291) in the mirrored topologies (290). The logical switch (381) includes two physical switches A and B.

Figure 4:
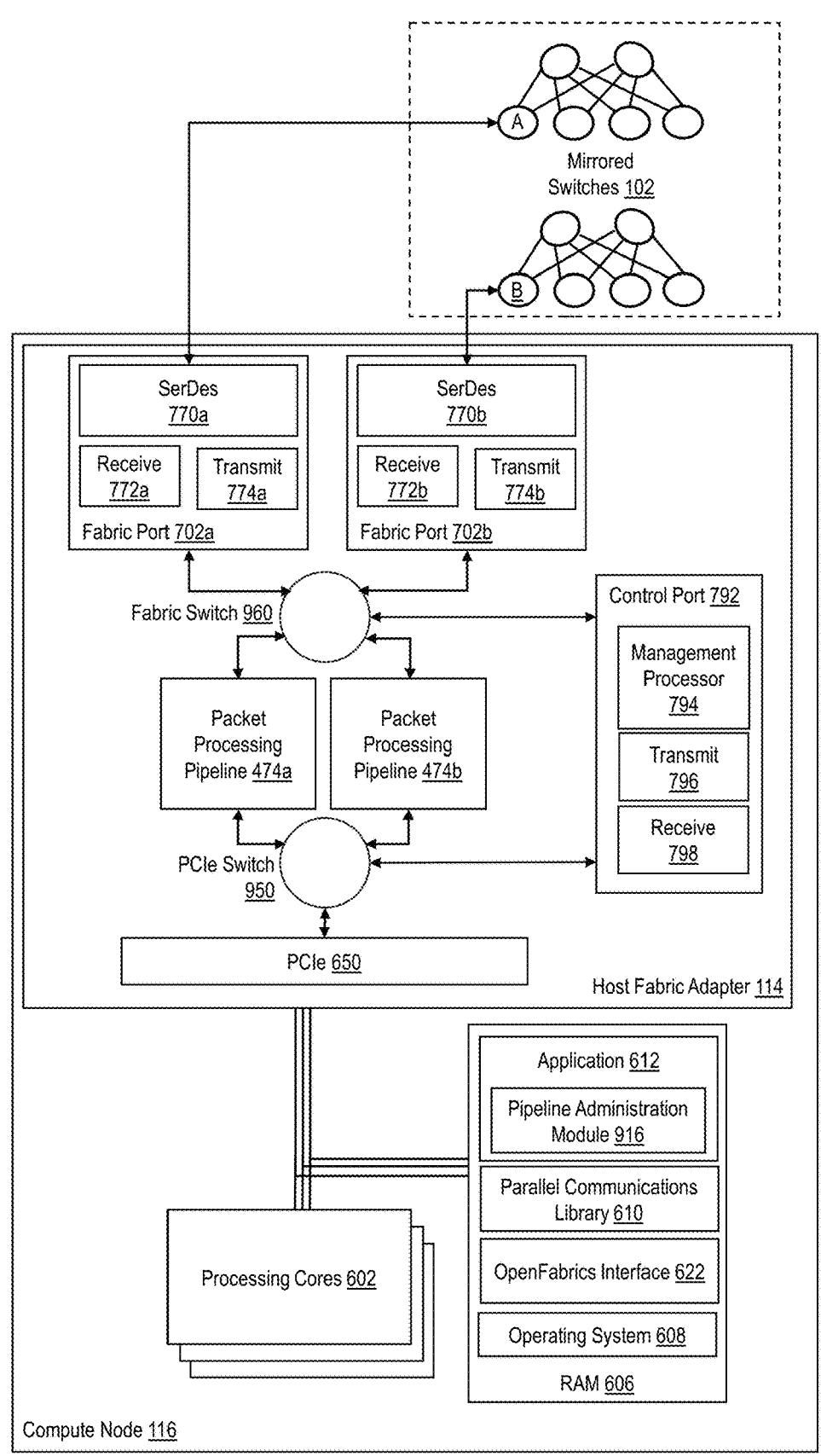
FIG. 4 sets forth a block diagram of an example compute node with a host fabric adapter according to embodiments of the present invention.

For further explanation, FIG. 4 sets forth a block diagram of a compute node including a host fabric adapter (114) according to embodiments of the present invention. The compute node (116) of FIG. 4 includes processing cores (602), random access memory ('RAM') (606) and a host fabric adapter (114). The example compute node (116) is coupled for data communications with a fabric (140) according to the present invention.

Stored in RAM (606) in the example of FIG. 4 is an application (612), a parallel communications library (610), an OpenFabrics Interface module (622), and an operating system (608). Applications for high-performance computing environments, artificial intelligence, and other complex environments are often directed to computationally intense problems of science, engineering, business, and others. A parallel communications library (610) is a library specification for communication between various nodes and clusters of a high-performance computing environment. A common protocol for HPC computing is the Message Passing Interface ('MPI'). MPI provides portability, scalability, and high-performance. MPI may be deployed on many distributed architectures, whether large or small, and each operation is often optimized for the specific hardware on which it runs.

OpenFabrics Interfaces (OFI), developed under the OpenFabrics Alliance, is a collection of libraries and applications used to export fabric services. The goal of OFI is to define interfaces that enable a tight semantic map between applications and underlying fabric services. The OFI module (622) of FIG. 3 packetizes the message stream from the parallel communications library for transmission.

The compute node of FIG. 4 includes a host fabric adapter (114) according to embodiments of the present invention. The HFA (114) of FIG. 4 includes a PCIe interconnect (650) or other such interconnect and two fabric ports (702*a* and 702*b*) configured to receive links (103) from corresponding ports of at least two switches (102A, 102B). Each of the switches (102A, 102B) are corresponding switches in parallel and independent topologies.

The HFA (114) of FIG. 4 includes two packet processing pipelines (474*a*, 474*b*) configured for reception and transmission of packets through the fabric ports (702*a*, 702*b*). The fabric ports (702*a*, 702*b*) include a transmit controller (774*a*, 774*b*), a receive controller (772*a*, 772*b*), and a serializer/deserializer (SerDes). The host fabric adapter of FIG. 4 has the same number of packet processing pipelines and fabric ports. The two packet processing pipelines are configured for packet length at line rate and message rate. Each of the packet processing pipelines are assigned to one or more fabric endpoints.

The HFA (114) of FIG. 4 includes a PCIe switch (950) configured to receive a data on the expansion bus (650) and select a pipeline (474*a*, 474*b*) for processing and transmission through the fabric and configured to receive data from one of the pipelines (474*a*, 474*b*) and transmit it on the expansion bus (650).

The HFA (114) of FIG. 4 includes a fabric switch (960) configured to receive a packet from one of the fabric ports (702*a*, 702*b*) and select a pipeline (474*a*, 474*b*) for processing and transmission to the PCIe switch (950) and to receive a packet processed on one of the pipelines (474*a* 474*b*) and select one of the fabric ports (702*a*, 702*b*) for transmission of the packet on the fabric.

Figure 5:
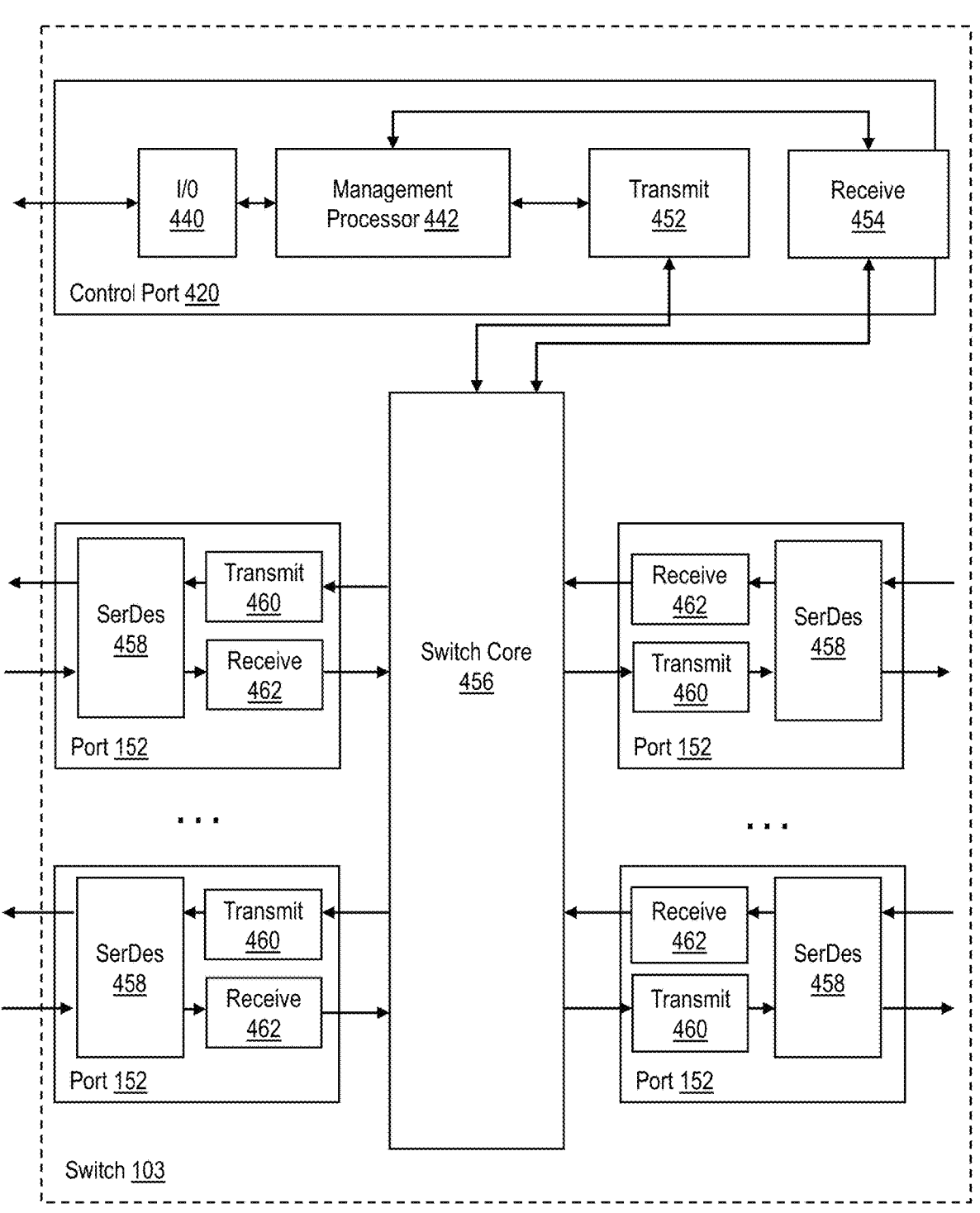
FIG. 5 sets forth a block diagram of an example switch according to embodiments of the present invention.

For further explanation, FIG. 5 sets forth a block diagram of an example switch useful in mirrored switch configurations according to embodiments of the present invention. The example switch (102) of FIG. 5 includes a control port (420), a switch core (448), and a number of ports (450). The control port (420) of FIG. 5 includes an input/output ('I/O') module (440), a management processor (442), a transmit controller (444), and a receive controller (446). The management processor (442) of the example switch of FIG. 4 maintains and updates routing tables for the switch. In the example of FIG. 5, each receive controller maintains the latest updated routing tables. The example switch (102) of FIG. 5 includes a number of ports (152). Each port (152) is coupled with the switch core (456) and a transmit controller (460) and a receive controller (462) and a SerDes (458).

Figure 6:
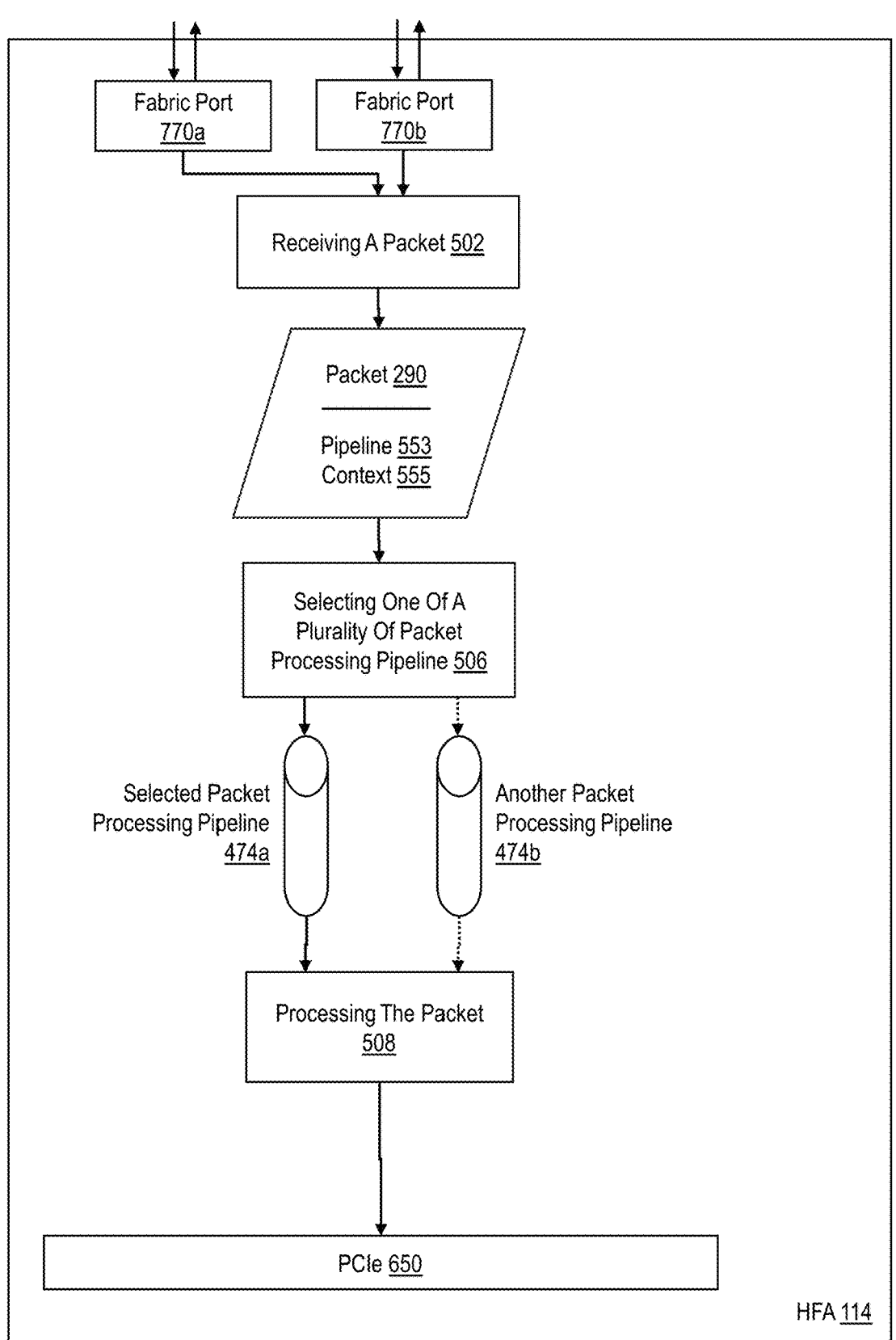
FIG. 6 sets forth a flowchart illustrating an example method of endpoint packet administration in a host fabric adapter according to embodiments of the present invention.

For further explanation, FIG. 6 sets forth a flowchart illustrating a method of endpoint packet administration in a host fabric adapter of high-performance computing environment. The host fabric adapter of FIG. 6 includes a plurality of fabric ports and a plurality of packet processing pipelines. Packet processing in a hardware pipeline refers to the efficient and systematic way in which switches according to embodiments of the present invention handle incoming and outgoing data packets. Hardware pipelines are optimized for parallel processing and can handle multiple packets simultaneously. They are designed to process packets quickly and reliably, which is crucial for high-speed data transmission and low-latency networking.

Incoming data packets enter the hardware pipeline for processing. The first stage often involves physical layer processing, such as signal decoding and error checking, to ensure the integrity of the incoming data. The packet's header is parsed to extract essential information like the source and destination addresses, protocol type, and packet length and so on. Based on the extracted header information, the packet is classified into different flows or queues. Each flow corresponds to a specific type of processing or routing decision.

The method of FIG. 6 includes receiving (502), through one of the plurality of fabric ports (770*a*, 770*b*), a packet (290) including a pipeline designation (553) wherein the pipeline designation identifies a context (555) associated with the packet flow. The term "context" refers to the information about the packet's state and how it should be handled within the pipeline. Context typically includes details such as the destination address, port, and quality of service requirements. Context is essential for making informed decisions about how to route, filter, or process the packet at each stage of the pipeline. Hardware devices often maintain context information in various forms, including tables, data structures, and memory buffers.

After classification and routing decisions are made based on the context, the packet may undergo further processing The context information is used to apply the appropriate policies and rules to the packet. The context plays a critical role in processing each packet correctly and efficiently as it moves through the pipeline.

The method of FIG. 6 includes, selecting (506), in dependence upon the pipeline designation (553), one of a plurality of packet processing pipelines (474*a*, 474*b*). A packet processing pipeline may be directly associated with a particular parallel and independent topology. That is, a pipeline may be configured to transmit and receive communications from only one of the parallel and independent topologies. Alternatively, packet processing pipelines may be independent of the plurality of parallel and independent topologies and service more than one parallel and independent topology.

The method of FIG. 6 includes processing (508) the packet through the selected packet processing pipeline (474*a*) for transmission on an expansion bus (650). Processing (508) the packet through the selected packet processing pipeline (474*a*) includes decapsulation of fabric-switched packet headers or trailers and processing the packet for transmission on the bus.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A host fabric adapter comprising:

a high-speed serial expansion bus;

at least two fabric ports configured to receive links from corresponding ports of at least two switches, each of the at least two switches comprising corresponding switches in parallel and independent topologies;

at least two packet processing pipelines configured for reception and transmission of packets through the fabric ports;

a Peripheral Component Interconnect Express (PCIe) switch configured to receive a packet on an expansion bus and select a pipeline for transmission and configured to receive a packet from one of the pipelines and transmit the packet on the expansion bus; and a fabric switch configured to:

receive a packet from one of the fabric ports and select a pipeline for transmission to the PCIe switch and to receive a packet on one of the pipelines; and select one of the fabric ports for transmission of the packet on the fabric.

2. The host fabric adapter of claim 1 wherein the at least two packet processing pipelines are configured for packet length at line rate and message rate.

3. The host fabric adapter of claim 1 wherein each of the packet processing pipelines are assigned to one or more fabric endpoints.

4. The host fabric adapter of claim 1 having the same number of packet processing pipelines and fabric ports.

5. The host fabric adapter of claim 1 wherein the expansion bus is a Peripheral Component Interconnect Express bus coupled for data communications with a compute node.

6. The host fabric adapter of claim 1 wherein the expansion bus is a Compute Express Link bus coupled for data communications with a compute node.

7. The host fabric adapter of claim 1 wherein the host fabric adapter is configured for a high-performance computing environment including:

a fabric comprising a plurality of switches and links configured into at least two parallel and independent topologies, the switches each having corresponding baseline bandwidths and corresponding radix and port configurations;

a plurality of compute nodes each including a host fabric adapter adapted for data transfer through ports dedicated to each of the topologies.

8. The host fabric adapter of claim 1 wherein the links comprise double-density cables.

9. A mirrored switch configuration, the mirrored switch configuration comprising:

at least two switches, each having corresponding baseline bandwidths and corresponding radix and port configurations;

a plurality of links, and a host fabric adapter ('HFA') including:

a high-speed serial expansion bus;

at least two fabric ports configured to receive links from corresponding ports of the at least two switches;

at least two pipelines configured for reception and transmission of packets through the fabric ports;

a Peripheral Component Interconnect Express (PCIe) switch configured to receive a packet on an expansion bus and select a pipeline for transmission and configured to receive a packet from one of the pipelines and transmit the packet on the expansion bus; and a fabric switch configured to receive a packet from one of the fabric ports and select a pipeline for transmission to the PCIe switch and configured to receive a packet on one of the pipelines and select one of the fabric ports for transmission of the packet on the fabric.

10. The mirrored switch configuration of claim 9 wherein the one link from one port of one of the switches and one link from a corresponding port of another of the switches is implemented through a double density cable adapted for the host fabric adapter and the switches.

11. The mirrored switch configuration of claim 9 wherein each of the packet processing pipelines are assigned to one or more fabric endpoints.

12. The mirrored switch configuration of claim 9 wherein the host fabric adapter includes the same number of packet processing pipelines and fabric ports.

13. The mirrored switch configuration of claim 9 wherein the links comprise double-density cables.

14. A method of endpoint packet administration in a host fabric adapter of a high-performance computing environment, the host fabric adapter comprising a plurality of fabric ports and a plurality of packet processing pipelines, the method comprising:

receiving, through one of the plurality of fabric ports, a packet including a pipeline designation;

selecting, in dependence upon the pipeline designation, one of a plurality of packet processing pipelines; and processing the packet through the selected packet processing pipeline for transmission on an expansion bus.

15. The method of claim 14 wherein the pipeline designation identifies a context associated with the packet flow.

16. The method of claim 14 wherein each of the plurality of packet processing pipelines are associated with one of a plurality of parallel and independent topologies.

17. The method of claim 14 wherein each of the plurality of packet processing pipelines are independent of the plurality of parallel and independent topologies.

18. The method of claim 14 wherein selecting a packet processing pipeline comprises selecting a pipeline associated with a context.

* * * * *